US012024658B2

(12) United States Patent
Lu et al.

(10) Patent No.: US 12,024,658 B2
(45) Date of Patent: Jul. 2, 2024

(54) WATER-BASED HYBRID PRESSURE SENSITIVE ADHESIVE COMPOSITION AND METHOD OF PRODUCING THE SAME

(71) Applicants: DOW SILICONES CORPORATION, Midland, MI (US); ROHM AND HAAS COMPANY, Collegeville, PA (US)

(72) Inventors: Ruihua Lu, Shanghai (CN); Li Ding, Shanghai (CN); Zhaohui Qu, Shanghai (CN); Yan Zhou, Shanghai (CN); Zhihua Liu, Shanghai (CN); Bochi Xu, Shanghai (CN); Rongrong Fan, Shanghai (CN)

(73) Assignees: DOW SILICONES CORPORATION, Midland, MI (US); ROHM AND HAAS COMPANY, Collegeville, PA (US)

(*) Notice: Subject to any disclaimer, the term of this patent is extended or adjusted under 35 U.S.C. 154(b) by 761 days.

(21) Appl. No.: 17/251,404

(22) PCT Filed: Jun. 12, 2018

(86) PCT No.: PCT/CN2018/090727
§ 371 (c)(1),
(2) Date: Dec. 11, 2020

(87) PCT Pub. No.: WO2019/237235
PCT Pub. Date: Dec. 19, 2019

(65) Prior Publication Data
US 2021/0246339 A1   Aug. 12, 2021

(51) Int. Cl.
| | | |
|---|---|---|
| C09J 7/38 | (2018.01) | |
| C08G 77/16 | (2006.01) | |
| C08G 77/46 | (2006.01) | |
| C08K 5/544 | (2006.01) | |
| C09J 133/08 | (2006.01) | |
| C09J 183/06 | (2006.01) | |

(52) U.S. Cl.
CPC .............. *C09J 7/385* (2018.01); *C08G 77/16* (2013.01); *C08G 77/46* (2013.01); *C08K 5/544* (2013.01); *C09J 133/08* (2013.01); *C09J 183/06* (2013.01); *C09J 2301/302* (2020.08); *C09J 2433/00* (2013.01); *C09J 2483/00* (2013.01)

(58) Field of Classification Search
CPC ........ C09J 7/385; C09J 133/08; C09J 183/06; C09J 183/04; C09J 183/12; C09J 2301/302; C09J 2433/00; C09J 2483/00; C08G 77/16; C08G 77/46; C08K 5/544
See application file for complete search history.

(56) References Cited

U.S. PATENT DOCUMENTS

| | | |
|---|---|---|
| 2012/0095159 A1 | 4/2012 | Liu et al. |
| 2015/0284612 A1 | 10/2015 | Ha et al. |
| 2021/0009879 A1* | 1/2021 | Engler .................. C09J 183/04 |

FOREIGN PATENT DOCUMENTS

| | | | |
|---|---|---|---|
| CN | 102803420 A | 11/2012 | |
| CN | 104263314 A | 1/2015 | |
| CN | 104769069 A | 7/2015 | |
| CN | 105255438 A | 1/2016 | |
| CN | 107075339 A | 8/2017 | |
| CN | 107428887 A | 12/2017 | |
| CN | 108047968 A | 5/2018 | |
| CN | 108467707 A | 8/2018 | |
| EP | 0289929 A2 | 11/1988 | |
| EP | 0295330 A2 | 12/1988 | |
| JP | S60197780 A | 10/1985 | |
| JP | 2002317165 A | 10/2002 | |
| JP | 2005112969 A | 4/2005 | |
| JP | 2007197514 A | 8/2007 | |
| JP | 2009280717 A | 12/2009 | |
| JP | 2017128636 A | 7/2017 | |
| JP | 6246021 B2 * | 12/2017 | ............ C09J 133/06 |
| WO | 2008003191 A1 | 1/2008 | |
| WO | 2015197004 A1 | 12/2015 | |
| WO | 2016123418 A1 | 8/2016 | |

OTHER PUBLICATIONS

Machine translation of JP-6246021-B2 (Year: 2023).*
Machine assisted English translation of JP2002317165A obtained from https://patents.google.com/patent on Jun. 2, 2022, 10 pages.
Machine assisted English translation of JP2005112969A obtained from https://patents.google.com/patent on Jun. 2, 2022, 13 pages.
Machine assisted English translation of JP2007197514A obtained from https://patents.google.com/patent on Jun. 2, 2022, 12 pages.
Machine assisted English translation of JP2007197514A obtained from https://patents.google.com/patent on Jun. 2, 2022, 11 pages.
Machine assisted English translation of CN104263314A obtained from https://patents.google.com/patent on Jun. 2, 2022, 9 pages.

(Continued)

*Primary Examiner* — Scott R. Walshon
(74) *Attorney, Agent, or Firm* — WARNER NORCROSS + JUDD LLP

(57) ABSTRACT

Provided herein is a water-based hybrid pressure sensitive adhesive composition and a method of producing the same. The composition comprises: (A) 100 parts by mass of a silicone pressure sensitive adhesive; (B) 5 to 80 parts by mass of an acrylic pressure sensitive adhesive; (C) water in a sufficient amount to emulsify or disperse components (A) and (B) in component (C); and (D) 0.1 to 10 parts by mass of an amino-functional alkoxysilane compound, a hydrolysate thereof, or a hydrolyzed condensate thereof. Components (A) and (B) are emulsified or dispersed in component (C). The composition can be cured to form a pressure sensitive adhesive exhibiting good peel adhesion and low silicone migration.

7 Claims, No Drawings

(56) References Cited

OTHER PUBLICATIONS

Machine assisted English translation of CN105255438A obtained from https://patents.google.com/patent on Jun. 2, 2022, 10 pages.
Machine assisted English translation of CN108047968A obtained from https://patents.google.com/patent on Jun. 2, 2022, 15 pages.
Machine assisted English translation of CN108467707A obtained from https://patents.google.com/patent on Jun. 2, 2022, 5 pages.
International Search Report for PCT/CN2018/090727 dated Feb. 28, 2019, 4 pages.
Machine assisted English translation of JPS60197780A obtained from https://worldwide.espacenet.com, 7 pages.
Machine assisted English translation of JP2017128636A obtained from https://patents.google.com/patent, 14 pages.

* cited by examiner

WATER-BASED HYBRID PRESSURE SENSITIVE ADHESIVE COMPOSITION AND METHOD OF PRODUCING THE SAME

CROSS-REFERENCE TO RELATED APPLICATIONS

This application claims priority to and is the National Stage of International Appl. No. PCT/CN2018/090727 filed on 12 Jun. 2018, the contents of which is incorporated herein by reference.

TECHNICAL FIELD

The present invention relates to a water-based hybrid pressure sensitive adhesive (PSA) composition and a method of producing the same.

BACKGROUND ART

A pressure sensitive adhesive (PSA) composition can be formed to an adhesive product which bonds to a substrate when pressure is applied to marry the adhesive product with the substrate. It is well-known that a silicone PSA composition, an acrylic PSA composition, hybrid PSA composition, and the like are available for various applications.

Silicone PSA compositions exhibit both good high and low temperature performance, have excellent chemical inertness, electrical insulating properties, and the ability to adhere to low surface energy substrates. However, the disadvantages of silicone PSA compositions is their high cost compared to other technologies. Other limitations include low tack and limited adhesion build, when necessary, in comparison to acrylic PSAs.

While, acrylic PSA compositions are relatively low in cost compared to other PSAs, adhere well to a variety of different surfaces and, if necessary, can be formulated to build adhesion to a surface. However, the disadvantages of acrylic PSA compositions include poor high temperature performance, poor low temperature performance, inability to adhere to surface with low surface energies.

Therefore, hybrid PSA compositions such as silicone-modified acrylic PSA compositions are studied. For examples, United States Patent Application Publication No. US 2012/0095159 A1 discloses a silicone acrylic hybrid pressure sensitive adhesive composition by chemically reacting together a silicone polymer component, a silicone resin component and an acrylic polymer component to form a hybrid silicone acrylate polymer wherein the acrylic polymer component is covalently self-crosslinked and covalently bound to the silicone polymer component and/or the silicone resin component.

However, the hybrid silicone acrylate polymer tends to form a gel, so that the chemical reaction to form the polymer is performed in an organic solvent. Furthermore, water-based PSA compositions are desired because of advantages in safety and environment, but it has been difficult to formulate such water-based compositions because it is too hard to emulsify or disperse the hybrid silicone acrylate polymer into water.

United States Patent Application Publication No. US 2015/0284612 A1 discloses an acryl-silicone-based hybrid emulsion adhesive composition comprising: an acrylic emulsion resin prepared by emulsion polymerization of an acrylic monomer mixture and a seed formed of a reactive silicone resin having reactive groups such as vinyl groups. However, because of poor reactivity in water of the acrylic monomer and a reactive silicone resin having vinyl groups and such a problem of silicone migration is observed from a cured acrylic-silicone-based hybrid PSA. Further, the cured acrylic-silicone-based hybrid PSA has insufficient peel adhesion.

PRIOR ART DOCUMENTS

Patent Documents

Patent Document 1: United States Patent Application Publication No. US 2012/0095159 A1
Patent Document 2: United States Patent Application Publication No. US 2015/0284612 A1

SUMMARY OF INVENTION

Technical Problem

The present invention was pursued in order to overcome the defects of prior art cited above and has an objective of providing a novel water-based hybrid pressure sensitive adhesive composition for various application, especially adhesive for shoe sole. Another object of the present invention is to provide a method of producing the novel water-based hybrid pressure sensitive adhesive composition.

Solution to Problem

The present invention provides a water-based hybrid pressure sensitive adhesive composition comprising:
  (A) 100 parts by mass of a silicone pressure sensitive adhesive;
  (B) 5 to 80 parts by mass of an acrylic pressure sensitive adhesive;
  (C) water in an amount sufficient to emulsify or disperse components (A) and (B) in component (C); and
  (D) 0.1 to 10 parts by mass of an amino-functional alkoxysilane compound, a hydrolysate thereof, or a hydrolyzed condensate thereof,
  wherein components (A) and (B) are emulsified or dispersed into component (C).

In specific exemplified embodiments, component (A) comprises: (A1) a linear or partially branched diorganopolysiloxane having one or more of silicon atom-bonded hydroxy groups per molecule, and (A2) a resinous organopolysiloxane comprising: $R_3SiO_{1/2}$ siloxane units and $SiO_{4/2}$ siloxane units, wherein R represents a $C_{1-20}$ alkyl, and a molar ratio of $R_3SiO_{1/2}$ siloxane units to $SiO_{4/2}$ siloxane units being in the range of from 0.5 to 1.2, in an amount such that a mass ratio of component (A2)/component (A1) is in the range of from 0.5 to 2.

In these or other specific exemplary embodiments, component (A) further comprises: (A3) an emulsifier and/or thickener, in an amount of from 1 to 30 parts by mass per 100 parts by mass of the sum of components (A1) and (A2).

In these or other specific exemplary embodiments, component (A3) is a polyvinylalcohol and/or a polyether modified organopolysiloxane.

In these or other specific exemplary embodiments, component (D) is aminoethylaminopropyltrimethoxysilane, aminoethylaminopropyltriethoxysilane, aminoethylaminopropylmethyldimethoxysilane, aminoethylaminoisopropylmethyldimethoxysilane, a mixture thereof, a hydrolysate thereof, or a hydrolyzed condensate thereof.

In these or other specific exemplary embodiments, the water-based hybrid pressure sensitive adhesive composition is useful to adhere to various substrates, but in particular, the material used for shoe sole. Thus, an exemplary use is for adhesion of shoe sole to the upper of a shoe.

The present invention also provides a method of producing the water-based hybrid pressure sensitive adhesive composition as above mentioned, and the method comprises:
(i) mixing a silicone pressure sensitive adhesive emulsified or dispersed in water and an acrylic pressure sensitive adhesive emulsified or dispersed in water to form a water-based hybrid pressure sensitive adhesive composition; and then
(ii) mixing an amino-functional alkoxysilane compound, a hydrolysate thereof, or a hydrolyzed condensate thereof with the water-based hybrid pressure sensitive adhesive composition.

Effects of Invention

The water-based hybrid pressure sensitive adhesive composition of the present invention can be cured to form a pressure sensitive adhesive exhibiting good peel adhesion and low silicone migration. Furthermore, the method of the present invention characteristically can efficiently carry out producing the water-based hybrid pressure sensitive adhesive composition.

Definitions

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments. Generally, as used herein a hyphen "-" or dash "—" in a range of values is "to" or "through."

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

DETAILED DESCRIPTION OF THE INVENTION

The water-based hybrid pressure sensitive adhesive composition of the present invention comprises:
(A) a silicone pressure sensitive adhesive;
(B) an acrylic pressure sensitive adhesive;
(C) water; and
(D) an amino-functional alkoxysilane compound, a hydrolysate thereof, or a hydrolyzed condensate thereof.

In this invention, component (A) is a silicone pressure sensitive adhesive. The silicone pressure sensitive adhesive generally comprises: (A1) a linear or partially branched diorganopolysiloxane having one or more of silicon atom-bonded hydroxy groups per molecule, and (A2) a resinous organopolysiloxane comprising $R_3SiO_{1/2}$ siloxane units and $SiO_{4/2}$ siloxane units.

Component (A1) is a linear or partially branched diorganopolysiloxane having one or more of silicon atom-bonded hydroxy groups per molecule. Examples of the molecular structure of component (A1) include straight chain and partially branched straight chain. Examples of silicon atom-bonded groups other than hydroxy groups include $C_{1-20}$ alkyl groups such as methyl groups, ethyl groups, propyl groups, butyl groups, pentyl groups, hexyl groups, heptyl groups, octyl groups, nonyl groups, decyl groups, undecyl groups, and dodecyl groups; $C_{2-20}$ alkenyl groups such as vinyl groups, allyl groups, butenyl groups, pentenyl groups, hexenyl groups, heptenyl groups, octenyl groups, nonenyl groups, decenyl groups, undecenyl group, and dodecenyl groups; $C_6$-20 aryl groups such as phenyl groups, tolyl groups, xylyl groups, naphthyl groups, anthracenyl groups, phenanthryl groups, and pyrenyl groups; $C_{7-20}$ aralkyl groups such as benzyl groups, phenethyl groups, naphthylethyl groups, naphthylpropyl groups, anthracenylethyl groups, phenanthrylethyl groups, and pyrenylethyl groups.

The viscosity of component (A1) at 25° C. is not limited, but is preferably at least 100 mm²/s. The reasons for the preceding are as follows: when the viscosity of component (A1) is less than the lower limit cited above, the hybrid pressure sensitive adhesive provided by curing the present composition tends to have an unsatisfactory peel adhesion. Component (A1) may be a highly viscous gum-like diorganopolysiloxane. Such a diorganopolysiloxane gum has a William's plasticity number of greater than or equal to 50.

Component (A2) is a resinous organopolysiloxane comprising $R_3SiO_{1/2}$ siloxane units and $SiO_{4/2}$ siloxane units.

In the above formula, R represents a $C_{1-20}$ alkyl group. Examples of the alkyl groups include methyl groups, ethyl groups, propyl groups, butyl groups, pentyl groups, hexyl groups, heptyl groups, octyl groups, nonyl groups, decyl groups, undecyl groups, and dodecyl groups.

In component (A2), it is desirable that the molar ratio of $R_3SiO_{1/2}$ siloxane units to $SiO_{4/2}$ siloxane units being in a range of from 0.5 to 1.2, alternatively in a range of from 0.6 to 1.1, alternatively in a range of from 0.7 to 1.1. The reasons for this are as follows: when the ratio is less than the cited lower limit, the hybrid pressure sensitive adhesive provided by curing the present composition tends to have an unsatisfactory peel adhesion; when, on the other hand, the ratio exceeds the upper limit cited above, the hybrid pressure sensitive adhesive provided by curing the present composition tends to have an unsatisfactory tackiness.

The content of component (A2) may be in an amount such that a mass ratio of component (A2)/component (A1) is in a range of from 0.5 to 2, alternatively in a range of from 0.8 to 2, alternatively in a range of from 1.0 to 2. The reasons for this are as follows: when the ratio is less than the cited lower limit, the hybrid pressure sensitive adhesive provided by curing the present composition tends to have an unsatisfactory peel adhesion; when, on the other hand, the ratio exceeds the upper limit cited above, the hybrid pressure sensitive adhesive provided by curing the present composition tends to have an unsatisfactory tackiness.

The silicone pressure sensitive adhesive for component (A) may further comprise (A3) an emulsifier in order to stabilize the mixture of components (A1) and (A2) in the water.

Examples of the emulsifier useful as component (A3) include anionic, cationic, nonionic or amphoteric surfactants. Mixtures of one or more of these may also be used. Suitable anionic organic surfactants include alkali metal soaps of higher fatty acids, alkyl aryl sulfonates, for example sodium dodecyl benzene sulfonate, long chain (fatty) alcohol sulfates, olefin sulfates and sulfonates, sulfated monoglycerides, sulfated esters, sulfonated ethoxylated alcohols, sulfosuccinates, alkane sulfonates, phosphate esters, alkyl isothionates, alkyl taurates and/or alkyl sarcosinates. Suitable cationic organic surfactants include alkylamine salts, quaternary ammonium salts, sulfonium salts and phosphonium salts. Suitable nonionic surfactants include siloxane polyoxyalkylene copolymers, condensates of ethylene oxide with a long chain (fatty) alcohol or (fatty) acid, for example a $C_{12-16}$ alcohol, condensates of ethylene oxide with an amine or an amide, condensation products of ethylene and propylene oxides, esters of glycerol, sucrose or sorbitol, fatty acid alkylol amides, sucrose esters, fluoro-surfactants and fatty amine oxides. Suitable amphoteric organic detergent surfactants include imidazoline compounds, alkylaminoacid salts and betaines. It is more preferred that the organic surfactants are nonionic or anionic. Mixtures of anionic and nonionic surfactants are particularly preferred.

Examples of other emulsifier useful as component (A3) include a polyvinylalcohols, and a polyether modified organopolysiloxane. It is more preferred that the emulsifiers are polyether modified MQ (wherein M is $R_3SiO_{1/2}$, and Q is $SiO_{4/2}$, wherein R represents $C_{1-20}$ alkyl) resins.

In the above formula, R is synonymous with this described above.

In the polyether modified MQ resin, a molar ratio of $R_3SiO_{1/2}$ siloxane units to $SiO_{4/2}$ siloxane units is not limited, but it may be in the range of from 0.5 to 1.5, alternatively in the range of from 0.5 to 1.2, alternatively in the range of from 0.6 to 1.1.

A method of producing the polyether modified MQ resin is not limited, but it may be produced by reaction a MQ resin with a hydroxylated polyether in the presence of a condensation catalyst such as dimethyltin dineodecanoate, stannous octoate, tetra(isopropoxy)titanium, tetra(n-butoxy)titanium, tetra(t-butoxy)titanium, di(isopropoxy)bis(ethylacetoacetate)titanium, di(isopropoxy)bis(methylacetoacetate)titanium, and di(isopropoxy)bis(acetylacetonate)titanium.

Component (A3) is preferably present in an amount of 1 to 30 parts by mass, alternatively 5 to 15 parts by mass based on 100 parts by mass of the sum of components (A1) and (A2). The reasons for this are as follows: when the content is less than the cited lower limit, the water-based silicone pressure sensitive adhesive tends to be unstable; when, on the other hand, the content exceeds the upper limit cited above, the hybrid pressure sensitive adhesive provided by curing the present composition tends to have an unsatisfactory tackiness.

The silicone pressure sensitive adhesive for component (A) may further comprise a thickener in order to stabilize the mixture of components (A1) and (A2) in the water. Examples of thickeners include xanthan gum, and hydroxyalkyl cellulose.

A preferred process for the production of the water-based hybrid pressure sensitive adhesive composition is to use a water-based silicone pressure sensitive adhesive composition. The emulsifier is added to facilitate emulsifying and/or dispersing component (A) in water.

The particle size of the emulsion formed is generally in the range 50 nanometer (nm) to 50 microns; the lower particle size emulsions are produced by application of high shear, for example in a homogenizer, sonolator, microfluidizer or a high shear mixer of the rotor and stator type.

In this invention, component (B) is an acrylic pressure sensitive adhesive produced by polymerization of monomers such as acrylic or acrylate monomers. Furthermore, component (B) may be produced by polymerization of the acrylic or acrylate monomers with other monomers such as ethylenically unsaturated carboxylic acid monomers, monovinylidene aromatic monomers, nitrile monomers, vinyl halide monomers, vinyl ester monomers, hydroxyalkyl (meth)acrylate monomers and (meth)acrylamide monomers.

Generally, the preferred acrylate monomers are (meth) acrylic acid, $C_{1-10}$ alkyl (meth)acrylates, alternatively alkoxy $C_{1-10}$ alkyl (meth)acrylates, alternatively $C_{1-8}$ alkyl (meth)acrylates or alkoxy $C_{1-8}$ alkyl(meth)acrylates. Examples of such acrylate monomers include n-butyl acrylate, sec-butyl acrylate, ethyl acrylate, hexyl acrylate, tert-butyl acrylate, 2-ethylhexyl acrylate, iso-octyl acrylate, 4-methyl-2-pentyl acrylate, 2-methyl butyl acrylate and tert-butyl acrylate, methyl methacrylate, butyl methacrylate, n-butyl methacrylate, iso-butyl methacrylate, ethyl methacrylate, iso-propyl methacrylate, hexyl methacrylate, cyclohexyl methacrylate, and cetyl methacrylate, methoxyethyl methacrylate, ethoxyethyl methacrylate, methoxyethyl acrylate, ethoxyethyl acrylate, butoxyethyl methacrylate, methoxybutyl acrylate and methoxyethoxyethyl acrylate The preferred acrylate monomers are n-butyl acrylate, butyl methacrylate, 2-ethyl hexyl acrylate, ethoxyethyl acrylate and methoxyethyl acrylate, with n-butyl acrylate being especially preferred. Frequently, two or more acrylate monomers are used. The alkyl esters of acrylic or methacrylic acid and alkoxyalkyl(meth)acrylate monomers can be employed as the sole monomer or a portion of the monomer mixture.

Representative monovinylidene aromatic monomers include, for example, styrene, α-methyl styrene, p-methyl styrene, t-butyl styrene, vinyltoluene, and halogenated styrene. Mixtures of one or more monovinylidene aromatic monomers can also be employed. The preferred monomers are styrene and α-methyl styrene.

"Nitrile monomers" useful in this invention include polymerizable unsaturated aliphatic nitrile monomers containing 2 to 4 carbon atoms in a linear or branched-chain which may optionally be substituted with halogen, acetyl, or additional nitrile groups. Such nitrile monomers include, for example, acrylonitrile, methacrylonitrile, chloroacrylonitrile, and fumaronitriie, with acrylonitrile being preferred.

"Vinyl halide monomers" useful herein include vinyl halides and vinylidene halides. Suitable vinyl halide monomers for this invention include vinyl bromide, vinylidene bromide, vinyl chloride and vinylidene chloride. Vinyl chloride and vinylidene chloride are especially preferred.

"Vinyl ester monomers" useful herein include vinyl acetate, vinyl propionate, vinyl butyrate, vinyl benzoate, vinyl 2-ethyl-hexanoate, vinyl stearate, and the vinyl ester of versatic acid The most preferred vinyl ester monomers for use in the present invention is vinyl acetate The "hydroxyalkyl(meth)acrylate monomers" useful herein include hydroxyalkyl acrylate and methacrylate monomers based on ethylene oxide, propylene oxide, or other higher alkylene oxides, or mixtures thereof. Examples are hydroxyethyl acrylate, hydroxypropyl acrylate, hydroxyethyl methacrylate, hydroxypropyl methacrylate, and hydroxybutyl acrylate Preferred hydroxyalkyl(meth)acrylate monomers are hydroxyethyl acrylate, hydroxypropyl acrylate, and hydroxybutyl acrylate.

"(Meth)acrylamide monomers" useful herein include the amides of α,β-olefinically unsaturated carboxylic acids, such as, for example, acrylamide, methacrylamide and diacetone acrylamide. The preferred (meth)acrylamide monomer is acrylamide.

A preferred process for the production of the water-based hybrid pressure sensitive adhesive composition is to use a water-based acrylic pressure sensitive adhesive composition. The methods of producing the water-based acrylic pressure sensitive adhesive composition are known in the art, see for examples, International Publication No. WO 94/03550 A1, United States Patent Application Publication No. US 2008/0281005 A1, and International Publication No. WO 2018/027888 A1. A surfactant or emulsifier is added to facilitate emulsifying component (B) in water.

The surfactants or emulsifiers suitable for use herein include conventional surface active agents typically known in the art for polymerization processes. The surfactant(s) can be added to the aqueous phase and/or monomer phase. An effective amount of surfactant in a seeded process is that amount selected to assist in stabilizing the particle as a colloid, minimizing contact between the particles and preventing coagulation In an unseeded process, an effective amount of surfactant will be that amount selected to influence the particle size.

The surfactants may be selected from anionic and non-ionic surfactants. Mixtures of one or more of these may also be used. Suitable anionic organic surfactants include alkali metal soaps of higher fatty acids, alkyl aryl sulfonates, for example sodium dodecyl benzene sulfonate, long chain (fatty) alcohol sulfates, olefin sulfates and sulfonates, sulfated monoglycerides, sulfated esters, sulfonated ethoxylated alcohols, sulphosuccinates, alkane sulfonates, phosphate esters, alkyl isothionates, alkyl taurates and/or alkyl sarcosinates. Suitable nonionic surfactants include siloxane polyoxyalkylene copolymers, condensates of ethylene oxide with a long chain (fatty) alcohol or (fatty) acid, for example a $C_{12-16}$ alcohol, condensates of ethylene oxide with an amine or an amide, condensation products of ethylene and propylene oxides, esters of glycerol, sucrose or sorbitol, fatty acid alkylol amides, sucrose esters, fluoro-surfactants, and fatty amine oxides. It is more preferred that the organic surfactants are nonionic or anionic. Mixtures of anionic and nonionic surfactants are particularly preferred.

The particle size of the emulsion formed is generally in the range 50 nanometer (nm) to 50 microns.

In the present invention, water-based acrylic pressure sensitive adhesive compositions for component (B) may be selected from any emulsion-type acrylic pressure sensitive adhesive known in the art. Examples thereof include, but are not limited to, RHOPLEX™ N-1031 Adhesive, ROBOND™ PS-8915, ROBOND™ PS-1088 ADHESIVE (commercially available from The Dow Chemical Company) or any combinations thereof.

In the present invention, the content of component (B) is 5 to 80 parts by mass, alternatively 10 to 80 parts by mass, alternatively 20 to 80 parts by mass, alternatively 30 to 80 parts by mass, alternatively 40 to 80 parts by mass, alternatively 5 to 70 parts by mass, alternatively 10 to 70 parts by mass, alternatively 20 to 70 parts by mass, alternatively 5 to 60 parts by mass, alternatively 10 to 70 parts by mass, alternatively 20 to 60 parts by mass, alternatively 30 to 70 parts by mass, alternatively 40 to 70 parts by mass, per 100 parts by mass of component (A). The reasons for this are as follows: when the content is less than the cited lower limit, the hybrid pressure sensitive adhesive provided by curing the present composition tends to have poor adhesive; when, on the other hand, the content exceeds the upper limit cited above, the hybrid pressure sensitive adhesive provided by curing the present composition tends to have an unsatisfactory tackiness at low and/or high temperature.

Component (C) is water to form the water-based hybrid pressure sensitive adhesive component of the present invention. Component (C) is not limited, but it is exemplified by tap water, purified water, mineral water and the like.

The content of component (C) is not limited, but it is in an amount sufficient to emulsify or disperse components (A) and (B) in water. So, if both components (A) and (B) are water-based pressure sensitive adhesives, component (C) may be an arbitrary component, that is, there may be no need to discretely add component (C) to the mixture because water would be carried in from components (A) and (B).

Component (D) is an amino-functional alkoxysilane compound, a hydrolysate thereof, or a hydrolyzed condensate thereof to cure the water-base hybrid pressure sensitive adhesive composition. Examples of component (D) include aminoethylaminopropyltrimethoxysilane, aminoethylaminopropyltriethoxysilane, aminoethylaminopropylmethyldimethoxysilane, aminoethylaminoisopropylmethyldimethoxysilane, a mixture thereof, a hydrolysate thereof, or a hydrolyzed condensate thereof.

In this invention, the content of component (D) is 0.1 to 10 parts by mass, alternatively 0.1 to 5 parts by mass, alternatively 0.5 to 10 parts by mass, alternatively 0.5 to 5 parts by mass, based on 100 parts by mass of the sum of components (A) and (B). The reasons for this are as follows: when the content is less than the cited lower limit, the water-based silicone pressure sensitive adhesive tends to be un-cured; when, on the other hand, the content exceeds the upper limit cited above, the hybrid pressure sensitive adhesive provided by curing the present composition tends to have an unsatisfactory tackiness.

A process for the production of the water-base hybrid pressure sensitive adhesive composition of the present invention is not limited, but it preferably comprises:
(i) mixing a silicone pressure sensitive adhesive emulsified or dispersed in water and an acrylic pressure sensitive adhesive emulsified or dispersed into water to form a water-based hybrid pressure sensitive adhesive composition; and then
(ii) mixing an amino-functional alkoxysilane compound, a hydrolysate thereof, or a hydrolyzed condensate thereof with the water-based hybrid pressure sensitive adhesive composition.

In the step (i), the content of the acrylic pressure sensitive adhesive emulsified or dispersed in water is an amount such that a non-volatile in the acrylic pressure sensitive adhesive emulsified or dispersed in water is 5 to 80 parts by mass, alternatively 20 to 80 parts by mass, alternatively 30 to 80 parts by mass, alternatively 40 to 80 parts by mass, alternatively 20 to 70 parts by mass, alternatively 20 to 60 parts by mass, alternatively 30 to 70 parts by mass, alternatively 40 to 70 parts by mass, per 100 parts by mass of a non-volatile in the silicone pressure sensitive adhesive emulsified or dispersed in water.

In this method, the process may further comprise the following step: the obtained emulsion is heated and vacuumed to remove dilute agents if necessary or desired, while adding water to the emulsion to compensate for water which is removed.

In the step (ii), the content of amino-functional alkoxysilane compound, a hydrolysate thereof, or a hydrolyzed condensate thereof is an amount such that the amino-functional alkoxysilane compound, a hydrolysate thereof, or a hydrolyzed condensate thereof is 0.1 to 10 parts by mass, alternatively 0.1 to 5 parts by mass, alternatively 0.5 to 10 parts by mass, alternatively 0.5 to 5 parts by mass, based on 100 parts by mass of a non-volatile of the water-based hybrid pressure sensitive adhesive composition.

Known coating processes, including roller coaters, blade coaters, Meyer rods or air coaters, can be used to prepare such articles of manufacture with the pressure sensitive adhesive compositions of the present invention. The resin may be coated directly to the article which then may or may not have a conventional release paper for temporary protection. Alternatively, the adhesive may be coated onto a release paper and then transferred to the second surface which is desired to be coated by passing both the release paper and the second surface together through rolls.

The coated substrate is dried by normal means, usually by passing it through a heating tunnel or oven which may use circulating hot air or infrared lamps to dry the coated substrate The drying time will be a function of a number of factors such as the heat capacity of the substrate, the type of heating, the oven temperature, air velocities (if circulating air is used) and the rate of passage of the substrate through the oven or heating tunnel. One skilled in art may readily determine suitable time/temperature relationships to determine optimum drying conditions in particular equipment for the product.

EXAMPLES

Examples are given below in order to specifically describe the present invention; however, the present invention is not limited to the examples that follow. In the examples that follow, the physical property values are values measured at 25° C., and the properties of pressure sensitive adhesive were measured as follows.
<Preparation of Pressure Sensitive Adhesive Sheet>
The water-based pressure sensitive adhesive composition was coated on creep paper of around 65 g/m$^2$ and cured under temperature 100° C. for 2 min. and 170° C. for 2 min., get around 50 g/m$^2$ dry adhesive coating weight.
<Adhesion>
The above pressure sensitive adhesive sheet was cut by 1 inch width and laminated on SUS (steel use stainless) panel. After 0.5 hr. standby peel the pressure sensitive adhesive sheet (the tape on substrate) from SUS panel with Adhesion/Release Tester AR-1500 (ChemInstruments, Fairfield, Ohio, USA). Peel speed and angle were set as 0.3 m/min. and 180°.
<Silicone Migration Ranking>
After the above test, visually check the appearance on SUS (steel use stainless) panel. There were 6 levels defined to rank the quantity of silicone on SUS panel. "OK" means didn't found silicone on SUS after peel visually, "5" means worst case, most silicone transferred on SUS.
<Lifting at RT>
The above pressure sensitive adhesive creep paper sheet was cut by 0.2 inch width and laminate on shoe model for 0.5 hr. and check if there is adhesion failure. "P" means pass and "F" means failure.
<Lifting at 90° C. for 10 Min.>
The above pressure sensitive adhesive creep paper sheet was cut by 0.2 inch with and laminate on shoe model and then place into 90° C. oven for 10 min., and take out to check if there is adhesion failure. "P" means pass and "F" means failure.

Reference Example 1

Preparation of Water-Based Silicone PSA 1

8.5 parts by mass of a hydroxyl terminated dimethylpolysiloxane gum having a William's plasticity number of 140, 12.6 parts by mass of a hydroxyl group-terminated polydimethylsiloxane with viscosity of about 80,000 mm$^2$/s, 16.4 parts by mass of 70 mass % MQ resin/xylene solution 1 (wherein M is $(CH_3)_3SiO_{1/2}$, Q is $SiO_2$, and M/Q ratio is 0.75) and 23.1 parts by mass of 75 mass % MQ resin/xylene solution 2 (wherein M is $(CH_3)_3SiO_{1/2}$, Q is $SiO_{4/2}$, and M/Q ratio is 0.9) were mixed together to get Silicone PSA 1. A mass ratio of MQ resins per polydimethylsiloxanes in Silicone PSA 1 is 1.4.

6.1 parts by mass of a polyether modified MQ resin (the stripped reaction product derived from heating 1 part by mass of a MQ resin consisting essentially of $(CH_3)_3SiO_{1/2}$ units and $SiO_2$ units in which the molar ratio of $(CH_3)_3SiO_{1/2}$ units to $SiO_2$ units was 0.75, and 3 parts by mass of a hydroxylated polyoxyethylene-polypropylene copolymer having a molecular weight of about 6200 and about a 1:1 molar ratio of ethylene oxide units to propylene oxide units, in 4 parts by mass of xylene employing stannous octoate catalyst) was mixed with Silicone PSA 1 to get a homogeneous mixture. Then 6.1 parts by mass of water was added with high shearing to form a thick O/W (oil in water) phase. Then 27.11 parts by mass of water was loaded to get Water-based Silicone PSA 1. Non-volatile content of Water-based Silicone PSA1 is 55 mass %.

Reference Example 2

Preparation of Water-Based Silicone PSA 2

9.35 parts by mass of a hydroxyl terminated dimethylpolysiloxane gum having a William's plasticity number of 140, 13.86 parts by mass of a hydroxyl group-terminated polydimethylsiloxane with viscosity of about 80,000 mm$^2$/s, 15.21 parts by mass of 70 mass % MQ resin/xylene solution 1 (wherein M is $(CH_3)_3SiO_{1/2}$, Q is $SiO_2$, and M/Q ratio is 0.75) and 21.42 parts by mass of 75 mass % MQ resin/xylene solution 2 (wherein M is $(CH_3)_3SiO_{1/2}$, Q is $SiO_{4/2}$, and M/Q ratio is 0.9) were mixed together to get Silicone PSA 2. A mass ratio of MQ resins per polydimethylsiloxanes in Silicone PSA 2 is 1.2.

6.1 parts by mass of a polyether modified MQ resin (the stripped reaction product derived from heating 1 part by mass of a MQ resin consisting essentially of $(CH_3)_3SiO_{1/2}$ units and $SiO_2$ units in which the molar ratio of $(CH_3)_3SiO_{1/2}$ units to $SiO_2$ units was 0.75, and 3 parts by mass of a hydroxylated polyoxyethylene-polypropylene copolymer having a molecular weight of about 6200 and about a 1:1 molar ratio of ethylene oxide units to propylene oxide units, in 4 parts by mass of xylene employing stannous octoate catalyst) was mixed with Silicone PSA 2 to get a homogeneous mixture. Then 6.1 parts by mass of water was added with high shearing to form a thick O/W (oil in water) phase. Then 27.87 parts by mass of water was loaded to get Water-based Silicone PSA 2. Non-volatile content of Water-based Silicone PSA 2 is 55 mass %.

Reference Example 3

Preparation of Water-Based Silicone PSA 3

7.35 parts by mass of a hydroxyl terminated dimethylpolysiloxane gum having a William's plasticity number of 140, 10.89 parts by mass of a hydroxyl group-terminated polydimethylsiloxane with viscosity of about 80,000 mm$^2$/s, 17.92 parts by mass of 70 mass % MQ resin/xylene solution 1 (wherein M is $(CH_3)_3SiO_{1/2}$, Q is $SiO_2$, and M/Q ratio is 0.75) and 25.24 parts by mass of 75 mass % MQ resin/xylene solution 2 (wherein M is $(CH_3)_3SiO_{1/2}$, Q is $SiO_{4/2}$, and M/Q ratio is 0.9) were mixed together to get Silicone PSA 3. A mass ratio of MQ resins per polydimethylsiloxanes in Silicone PSA 3 is 1.8.

6.1 parts by mass of a polyether modified MQ resin (the stripped reaction product derived from heating 1 part by mass of a MQ resin consisting essentially of $(CH_3)_3SiO_{1/2}$ units and $SiO_2$ units in which the molar ratio of $(CH_3)_3SiO_{1/2}$ units to $SiO_2$ units was 0.75, and 3 parts by mass of a hydroxylated polyoxyethylene-polypropylene copolymer having a molecular weight of about 6200 and about a 1:1 molar ratio of ethylene oxide units to propylene oxide units, in 4 parts by mass of xylene employing stannous octoate catalyst) was mixed with Silicone PSA 3 to get a homogeneous mixture. Then 6.1 parts by mass of water was added with high shearing to form a thick O/W (oil in water) phase. Then 26.31 parts by mass of water was loaded to get Water-based Silicone PSA 3. Non-volatile content of Water-based Silicone PSA 3 is 55 mass %.

Practical Examples 1-6 and Comparative Examples 1-4

Water-based hybrid pressure sensitive adhesive compositions were prepared by mixing the following components (A) and (B), and then mixing component (D) in the compositions (parts by mass) shown in Tables 1 and 2. The physical property values of a pressure sensitive adhesive composition were evaluated. These results are shown in Tables 1 and 2.

The following components were used as component (A).
Component (a1): Water-based Silicone PAS 1 produced by Reference Example 1
Component (a2): Water-based Silicone PAS 2 produced by Reference Example 2
Component (a3): Water-based Silicone PAS 3 produced by Reference Example 3

The following components were used as component (B).
Component (b1): Water-based Acrylic PAS 1 (Non-volatile content is 54 mass %; trade name: RHOPLEX™ N-1031 Adhesive, commercially available from The Dow Chemical Company)
Component (b2): Water-based Acrylic PSA 2 (Non-volatile content is 50 mass %; trade name: ROBOND™ PS-8915, commercially available from The Dow Chemical Company)
Component (b3): Water-based Acrylic PSA 3 (Non-volatile content is 45 mass %; trade name: ROBOND™ PS-1088 ADHESIVE, commercially available from The Dow Chemical Company)

The following components were used as component (D).
Component (d1): aminoethyl aminoisopropyl methyl dimethoxysilane (trade name: RDOWSIL™ Z-8090, commercially available from Dow Silicones Corporation)

TABLE 1

| | | | Category Practical Examples | | | | | |
|---|---|---|---|---|---|---|---|---|
| Item | | | 1 | 2 | 3 | 4 | 5 | 6 |
| Formulation of Water-based PSA (parts by mass) | (A) | (a1) | 70 | 0 | 0 | 70 | 70 | 70 |
| | | (a2) | 0 | 70 | 0 | 0 | 0 | 0 |
| | | (a3) | 0 | 0 | 70 | 0 | 0 | 0 |

TABLE 1-continued

|  |  |  | Category Practical Examples | | | | | |
|---|---|---|---|---|---|---|---|---|
| Item | | | 1 | 2 | 3 | 4 | 5 | 6 |
| | (B) | (b1) | 30 | 30 | 30 | 30 | 0 | 0 |
| | | (b2) | 0 | 0 | 0 | 0 | 30 | 0 |
| | | (b3) | 0 | 0 | 0 | 0 | 0 | 30 |
| | (D) | (d1) | 0.68 | 0.68 | 0.68 | 0.91 | 0.68 | 0.68 |
| Tack (gf) | | | 52.4 | 73.4 | 18.4 | 42.2 | 59.8 | 73.0 |
| Adhesion (gf/inch.) | | | 775.4 | 549.0 | 854.5 | 782.3 | 879.3 | 877.1 |
| Silicone migration ranking | | | OK | OK | OK | OK | OK | OK |
| Lifting at RT | | | P | P | P | P | P | P |
| Lifting at 90° C. for 10 min. | | | F | F | F | F | F | P |

TABLE 2

|  |  |  | Category Comparative Examples | | | |
|---|---|---|---|---|---|---|
| Item | | | 1 | 2 | 3 | 4 |
| Formulation of Water-based PSA (parts by mass) | (A) | (a1) | 100 | 0 | 70 | 0 |
| | (B) | (b1) | 0 | 100 | 30 | 100 |
| | (D) | (d1) | 0.97 | 0 | 0 | 0 |
| Tack (gf) | | | 18.4 | 111.9 | 43.3 | 52.6 |
| Adhesion (gf/inch.) | | | 757.5 | 515.5 | 267.3 | 416.2 |
| Silicone migration ranking | | | 5# | OK | OK | 3# |
| Lifting at RT | | | P | F | P | F |
| Lifting at 90° C. for 10 min. | | | — | — | F | — |

INDUSTRIAL APPLICABILITY

With said water-based hybrid pressure sensitive adhesive composition according to the present invention, a practically useful, safe and environmentally-friendly emulsion type pressure sensitive adhesive which has good peel adhesion could be obtained. The industrial applicability covers almost all potential use of water-based pressure sensitive adhesive, especially for application to adhere shoe sole.

The invention claimed is:

1. A water-based hybrid pressure sensitive adhesive composition, the composition comprising:
   (A) 100 parts by mass of a silicone pressure sensitive adhesive;
   (B) 5 to 80 parts by mass of an acrylic pressure sensitive adhesive;
   (C) water in an amount sufficient to emulsify or disperse components (A) and (B) into component (C); and
   (D) 0.1 to 10 parts by mass of an amino-functional alkoxysilane compound, a hydrolysate thereof, or a hydrolyzed condensate thereof;
   wherein components (A) and (B) are emulsified or dispersed in component (C); and
   wherein component (A) comprises:
   (A1) a linear or partially branched diorganopolysiloxane having one or more of silicon atom-bonded hydroxy groups per molecule; and
   (A2) a resinous organopolysiloxane comprising: $R_3SiO_{1/2}$ siloxane units and $SiO_{4/2}$ siloxane units, wherein R represents a $C_{1-20}$ alkyl, and a molar ratio of $R_3SiO_{1/2}$ siloxane units to $SiO_{4/2}$ siloxane units being in the range of from 0.5 to 1.2, in an amount such that a mass ratio of component (A2)/component (A1) is in the range of from 0.5 to 2.

2. The water-based hybrid pressure sensitive adhesive composition according to claim 1, wherein:
   i) the molar ratio of $R_3SiO_{1/2}$ siloxane units to $SiO_{4/2}$ siloxane units of component (A2) is in the range of from 0.7 to 1.1; ii) the mass ratio of component (A2)/component (A1) is in the range of from 1 to 2: or iii) both i) and ii).

3. The water-based hybrid pressure sensitive adhesive composition according to claim 1, wherein component (A) further comprises:
   (A3) an emulsifier, in an amount of from 1 to 30 parts by mass per 100 parts by mass of the sum of components (A1) and (A2).

4. The water-based hybrid pressure sensitive adhesive composition according to claim 3, wherein component (A3) is a polyvinylalcohol and/or a polyether modified organopolysiloxane.

5. The water-based hybrid pressure sensitive adhesive composition according to claim 1, wherein component (D) is aminoethylaminopropyltrimethoxysilane, aminoethylaminopropyltriethoxysilane, aminoethylaminopropylmethyldimethoxysilane, aminoethylaminoisopropylmethyldimethoxysilane, a mixture thereof, a hydrolysate thereof, or a hydrolyzed condensate thereof.

6. A shoe sole adhered via the water-based hybrid pressure sensitive adhesive composition according to claim 1.

7. A method of producing the water-based hybrid pressure sensitive adhesive composition according to claim 1, the method comprising:
   (i) mixing a silicone pressure sensitive adhesive emulsified or dispersed in water and an acrylic pressure sensitive adhesive emulsified or dispersed in water to form a water-based hybrid pressure sensitive adhesive composition; and
   (ii) mixing an amino-functional alkoxysilane compound, a hydrolysate thereof, or a hydrolyzed condensate thereof with the water-based hybrid pressure sensitive adhesive composition.

* * * * *